US008490185B2

(12) United States Patent
Gillum et al.

(10) Patent No.: US 8,490,185 B2
(45) Date of Patent: Jul. 16, 2013

(54) DYNAMIC SPAM VIEW SETTINGS

(75) Inventors: Eliot C. Gillum, Mountain View, CA (US); Krishna Charan Vitaldevara, Fremont, CA (US); Jason D. Walter, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 12/163,027

(22) Filed: Jun. 27, 2008

(65) Prior Publication Data

US 2010/0251362 A1    Sep. 30, 2010

(51) Int. Cl.
| | |
|---|---|
| G06F 11/00 | (2006.01) |
| G06F 12/14 | (2006.01) |
| G06F 12/16 | (2006.01) |
| G06F 3/00 | (2006.01) |
| G06F 3/048 | (2006.01) |
| G08B 23/00 | (2006.01) |

(52) U.S. Cl.
USPC ............... 726/22; 726/24; 715/752; 715/833

(58) Field of Classification Search
USPC ............................... 726/22, 24; 715/752, 833
See application file for complete search history.

(56) References Cited

U.S. PATENT DOCUMENTS

| | | | |
|---|---|---|---|
| 6,732,157 B1 | 5/2004 | Gordon et al. | |
| 7,197,539 B1 | 3/2007 | Cooley | |
| 7,219,148 B2 | 5/2007 | Rounthwaite et al. | |
| 7,249,162 B2 | 7/2007 | Rounthwaite et al. | |
| 2004/0083270 A1 | 4/2004 | Heckerman et al. | |
| 2006/0015561 A1 | 1/2006 | Murphy et al. | |
| 2006/0036693 A1 | 2/2006 | Hulten et al. | |
| 2006/0047766 A1* | 3/2006 | Spadea, III | 709/206 |
| 2006/0149821 A1 | 7/2006 | Rajan et al. | |
| 2006/0224673 A1 | 10/2006 | Stern et al. | |
| 2007/0156886 A1 | 7/2007 | Srivastava | |
| 2007/0220607 A1* | 9/2007 | Sprosts et al. | 726/24 |

OTHER PUBLICATIONS

Using MDaemon AntiSpam for Spam Control © 2003 Alt-N Technologies.*
MDaemon Email Server for Windows 11.0.3 Version History Obtained from (http://www.soft32.com/Download/free-trial/MDaemon_Email_Server_for_Windows/4-11685-7.html) on Mar. 25, 2011.*
Slashdot FAQ—Comments and Moderation http://web.archive.org/web/20081119004551/http://www.slashdot.org/faq/com-mod.shtml Retreived Oct. 27, 2011.*
Snapshots of the 'D2' or 'Discussion2' slider controls used by http://slashdot.org/ in use. Snapshots taken Oct. 31, 2011.*

(Continued)

Primary Examiner — Kambiz Zand
Assistant Examiner — Benjamin Kaplan
(74) Attorney, Agent, or Firm — Vierra Magen Marcus LLP (57) ABSTRACT

A method of displaying email messages to a user is provided. Spam classification information and meta data is associated with email messages received for a user. Email message summary information is displayed in a user interface based on whether the meta data associated with the message meets or exceeds a threshold display level for the summary information. The user provides input via the user interface which is an indication to change the threshold display level and the change is dynamically displayed.

19 Claims, 11 Drawing Sheets

OTHER PUBLICATIONS

Microsoft Windows XP Microsoft Windows XP—Change your screen resolution (and Screen shot of the described control) http://web.archive.org/web/20040504141845/http://www.microsoft.com/resources/documentation/windows/xp/all/proddocs/en-us/display_change_screen_resolution.mspx © 2004 Microsoft Corporation.*

Metzger, et al., A Multiagent-based Peer-to Peer Network in Java for Distributed Spam Filtering, Multi-Agent Systems and Applications III, Lecture Notes in Computer Science, 2003, vol. 2691/2003, Springer, Berlin/Heidelberg.

Adjusting the Spam Confidence Level Threshold, Exchange 2007, Copyright Microsoft Corporation 2008, http://technet.microsoft.com/en-us/library/aa995744(EXCHG.80).aspx.

Effective Spam Filtering with MDaemon, Zen Software, 12 pages, http://files.keray.com/sales/altn/whitepaper/Effective_spam_filtering_with_mdaemon.pdf, England.

Gray, et al., Personalised, Collaborative Spam Filtering, Trinity College, https://www.cs.tcd.ie/publications/tech-reports/reports.04/TCD-CS-2004/36.pdf, Ireland, 2004.

* cited by examiner

DYNAMIC SPAM VIEW SETTINGS

BACKGROUND

A critical feature for email user agents and services is the ability for users to avoid unwanted emails variously categorized as Spam, Phishing email and junk emails. Spam or junk e-mail is unwanted or unsolicited email from the Internet. Typically, an online email service provider incorporates spam and phishing email filters into their service which eliminate spam before it reaches a user's inbox. Some services may allow users a number of limited options to adjust the filters. Users may, for example, navigate to a settings page which allows them to select between settings which can alter how stringently a filter is applied to incoming messages.

Normally, changing such settings have no immediate effect on the appearance of mail a user's mail folder. The effect of changing the users settings is on mail delivered subsequent to the change. New mail delivered subsequent to the change is delivered in accordance with the settings provided by the user. Mail previously delivered and routed to a deleted items folder or a special Junk or Spam folder is not affected.

In addition, users typically have the option of setting up a safe list and a black list. The safe list indicates that some mail which was identified as potentially being spam is acceptable to deliver. The blacklist indicates that mail from specific senders or domains would not be delivered.

SUMMARY

Technology is disclosed which allows users to dynamically view and select the severity of unwanted email which is presented to them in a user interface. A user interface provides an email user with a spam filter view selector, allowing the user to change the threshold of how much email classified as spam is displayed dynamically. A spam filter characterizes each email received for a user with a severity rating. This rating, along with other meta data associated with the email, is used to present varying levels of email to a user as the user alters the threshold view selector. The technology can monitor a user's email interactions to suggest movement of the severity settings, and can alter the settings or suggest that the user alter the settings themselves.

In one aspect, a method of displaying email messages to a user is provided. Spam is classified and meta data is associated with email messages received for a user. Email message summary information is displayed in a user interface based on whether the classification and meta data associated with the message meets or exceeds a threshold display level for the summary information. The user provides input via the user interface which is an indication to change the threshold display level and the change is dynamically displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology providing dynamic filtering of email classified as spam is provided. A user interface provides an email user with a threshold filter selector, in one case in the form of a slider, allowing the user to change the user's perception of how much email likely to be spam is displayed in an Inbox or Spam folder. A spam filter characterizes each email received for a user with a severity rating. This rating, along with other meta data associated with the email, is used to present varying quantities of email classified as spam to a user as the user alters the severity threshold. The technology can also monitor user's email interactions to suggest movement of the severity settings, and can alter the settings or suggest that the user alter the settings themselves.

As discussed below, the technology may be implemented in a web-based email provider or a client application running on a user's processing device. Such web-based service providers are currently operated by providers such as Microsoft®, Yahoo®, AOL®, or other online service providers. Such services and applications may include spam classification systems, which monitor inbound mail. Spam classifiers generally examine a number of criteria to determine whether or not a message comprises junk or spam email. A classifier may assign a score for each criteria, which certain criteria having more weight than others. If an email's total score exceeds a certain threshold, the email client or messaging service decides what to do with the message. Typically, the spam email is sent to the junk or deleted items folder. For example, a scale of 1-100 may be used with lower numbers (e.g. 1) indicating that a message is not likely spam, while higher number (e.g. 99) indicate a message is very likely spam. The spam filter may apply global blacklists or global white lists for individual addresses or domains.

Figure 1:
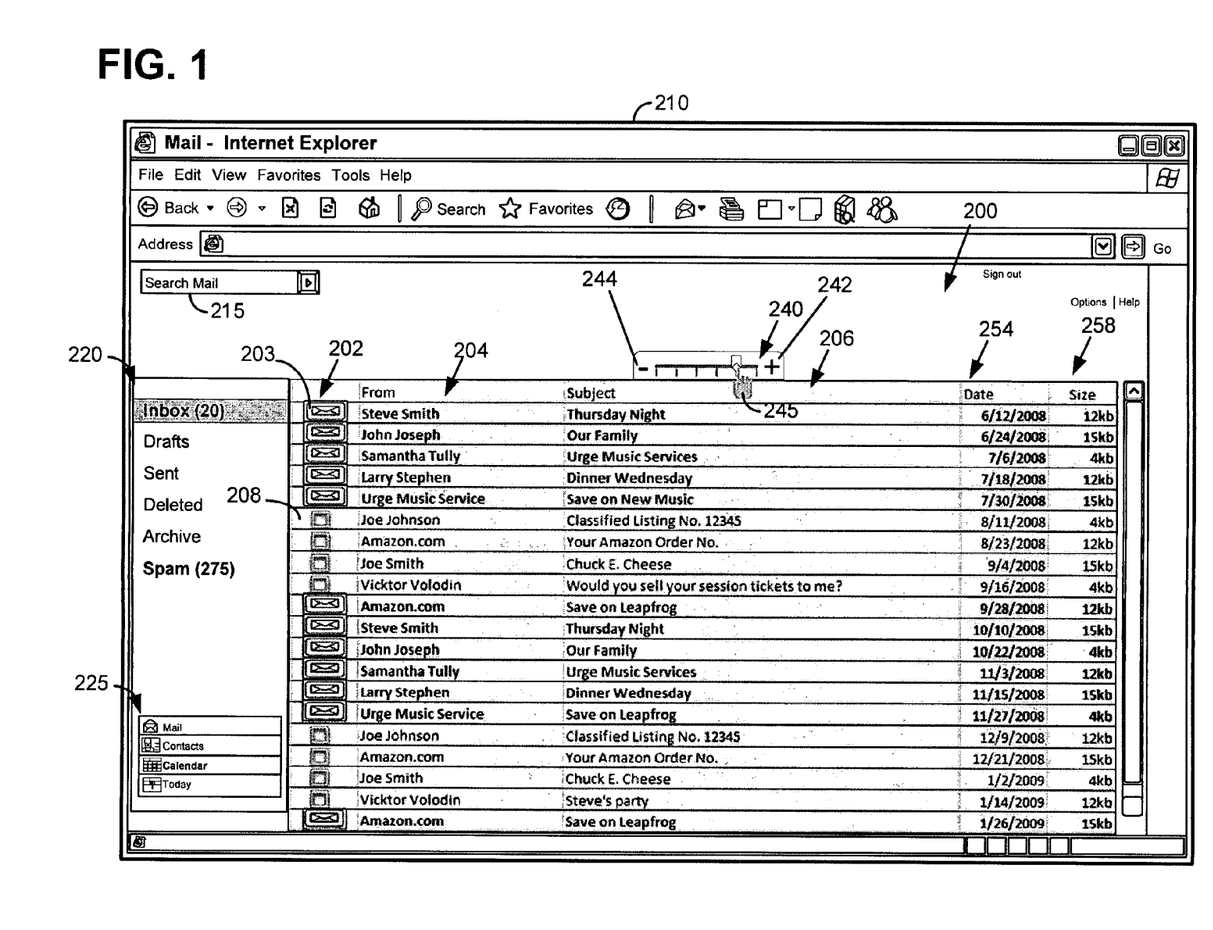
FIG. 1 is a depiction of the graphical user interface for use in accordance with the present technology.
Figure 2:
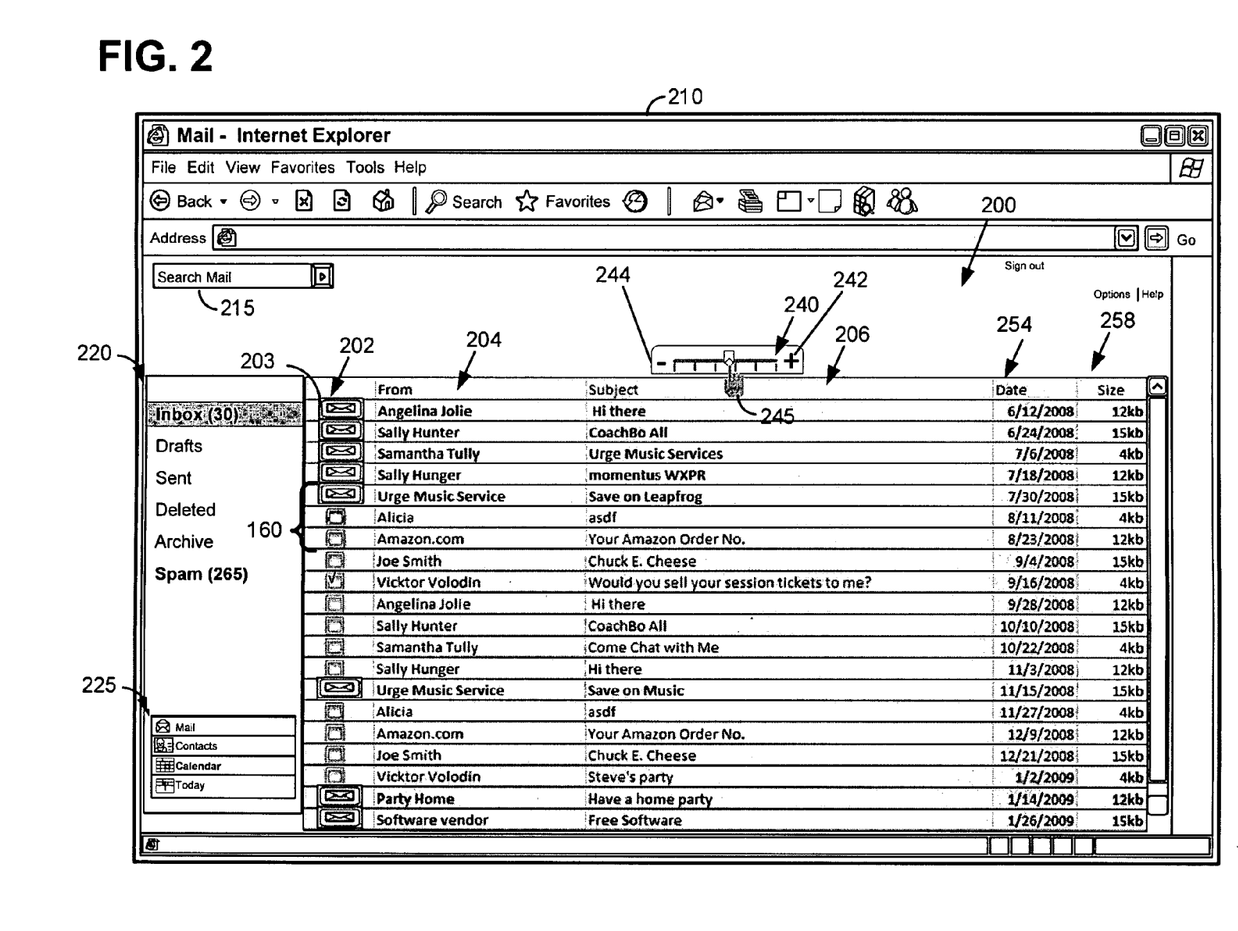
FIG. 2 is a second embodiment of the user interface depicted in FIG. 1.
Figure 3:
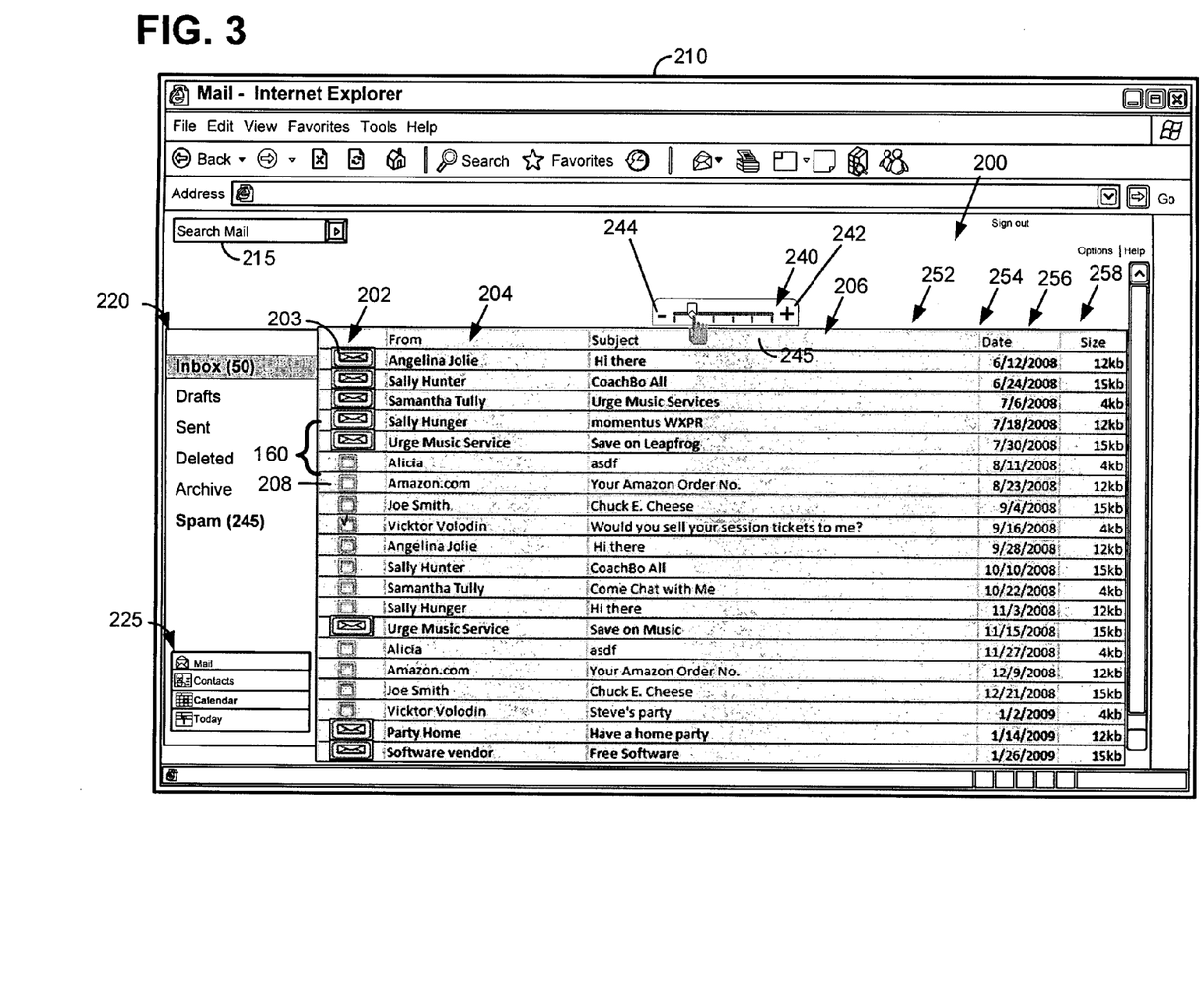
FIG. 3 is a third embodiment of the user interface depicted in FIG. 1.

FIG. 1 illustrates a first user interface for use in accordance with the technology. The user interface may be presented when a user operating a web browser initiates a browser process which contacts a web-based email service or provided by a client application on a processing device. In FIG. 1, the interface is illustrated as being in a web browser such as Microsoft's Internet Explorer which provides a window 210 for user interface 200. The user interface 200 may include a listing of summarized email headers in a grid 205. The grid interface shows the read or unread status 202, the sender 204, the subject of the message 206, as well as the date 254 and size 258 of the message. Read or unread status can be indicated by icons 203 and check boxes 208, respectively. Unread emails can also be highlighted by bolding the summary information illustrated in columns 204 and 206. The user navigates through the user interface through use of a selection mechanism such as a pointer 245. By highlighting any one of the email headers listed in grid 205, and operating a selection paradigm such as double clicking on the highlighted header, a message window opens explaining message information associated with the summary information listed in grid 205. Likewise, the user can utilize the navigation icon 245 to navigate through a mail interface menu 220 which allows the user to check various email folders such as the inbox, drafts, sent, deleted, archived, and spam folders. A service navigation window 225 allows the user to select between different interfaces for mail, contacts, and calendars.

A search box 215 is also provided. The search mailbox allows a user to enter key words into a search engine which accesses an index of all the user's mail to provide the user with key word searching of the user's mail data. One implementation of this feature is discussed below.

In accordance with the technology, a spam threshold selector 240—in this example in the form of a slider—allows the user to adjust the spam classification experience by allowing the user to dynamically set the aggressiveness of the spam message display between a high threshold or completely safe display as indicated by "+" sign 242, and a low threshold or completely open display (showing all or nearly all messages) as indicated by "−" sign 244. By allowing users to change the aggressiveness of filter threshold views, as applicable to a particular folder, users can evaluate the particular level that is appropriate for their mailbox experience. This also provides the user with ability to change settings as required. The spectrum of available settings depends on the folder that the user is viewing.

The threshold selector 240 may simply change the messages displayed in a particular folder (such as the Spam folder) or also change the routing of spam messages between the Inbox and a Spam folder and/or Deleted items folder. A high threshold setting would route additional messages to the Spam and/or deleted items folder, while a lower threshold setting would allow placement of additional messages in the Inbox folder.

Examples of how movement of the threshold selector affects the user view are shown in FIGS. 1-5. As illustrated in FIG. 1, the slider position is closer to the "+" sign 242 than the minus sign. Hence, the inbox view shows a listing of twenty unread messages. All messages displayed in the inbox in FIG. 1 have a spam score and associated metadata indicating that the messages are likely safe. That is, the spam classifier has determined that the likelihood that any of the messages indicated in the view in FIG. 1 are spam is quite low. This is contrasted with FIGS. 2 and 3 which show movement of the slider to a middle position (FIG. 2) and toward a minus position (FIG. 3) where the number of unread messages increases (from 30 in FIG. 2 to 50 in FIG. 3), and the number of junk messages indicated by the system to be in the SPAM folder decreases from 265 to 245. It will be understood that the summary information presented in the user interface 200 is limited to a number of rows defined by user settings such as display size, font size and window size. The number of messages in the summary information may exceed those initially available for viewing in the interface window, but the indicator regarding the number of unread messages is indicative of the number of messages in the folder rather than the display window. As shown at in FIGS. 2 and 3, respectively, moving the slider towards the minus position increases the number of junk mail messages in the Inbox and decreases those shown in the Spam folder viewing display.

In some cases, email exceeding a high threshold (nearly certain spam) may not be delivered at all. In one embodiment, all messages, including those which a provider may have previously considered as being classified as nearly certain to be spam and for which the provider may have decided to automatically delete without user knowledge, are characterized and provided on the lowest filter setting (i.e. the when the selector is set to the lowest threshold setting). It will be recognized that various gradients can be user for each threshold setting selection, and that the lowest selection may include or exclude mail below a service provider's threshold.

Figure 4:
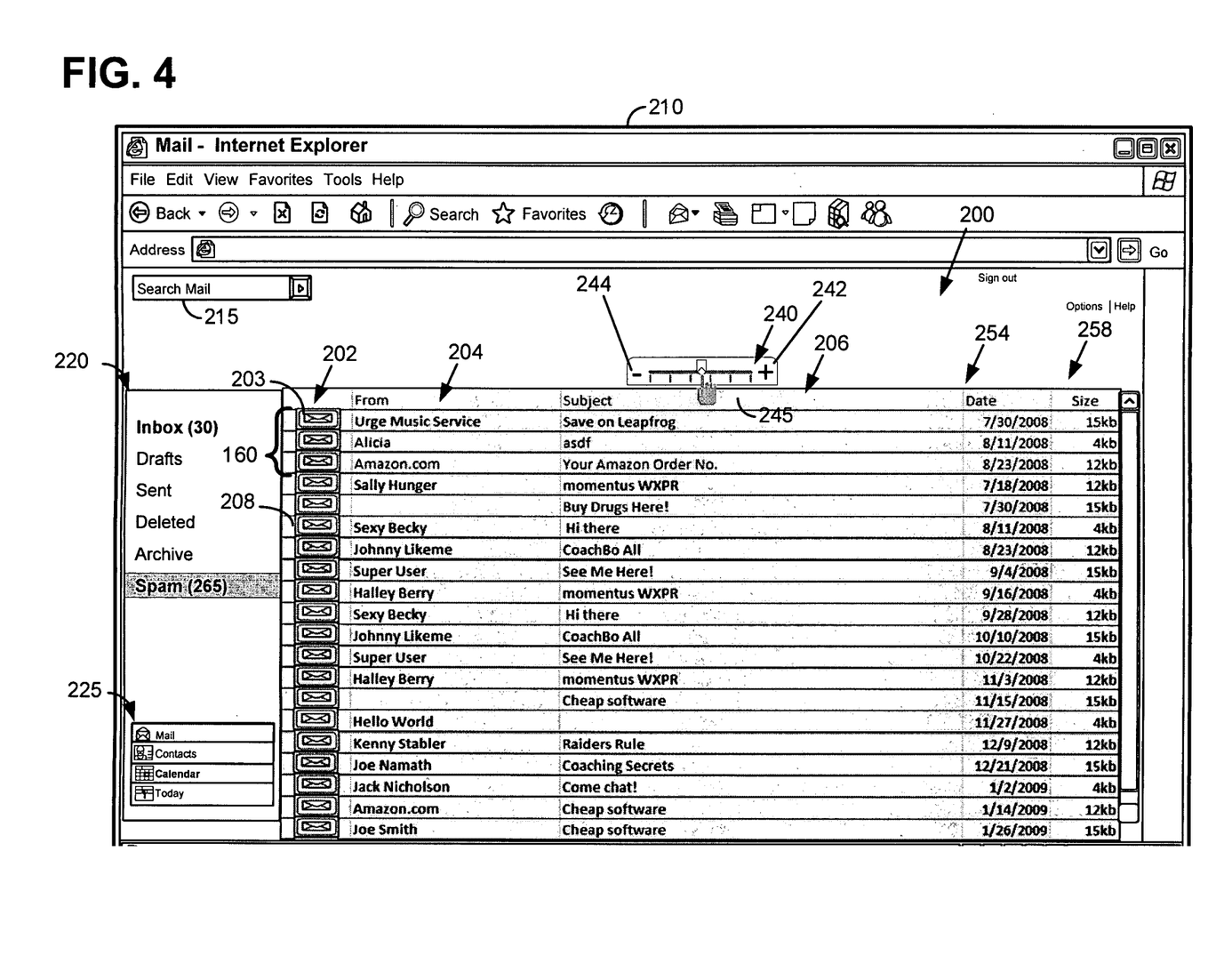
FIGS. 4 and 5 illustrate the effect of changing the threshold display in a user interface for a Spam folder.
Figure 5:
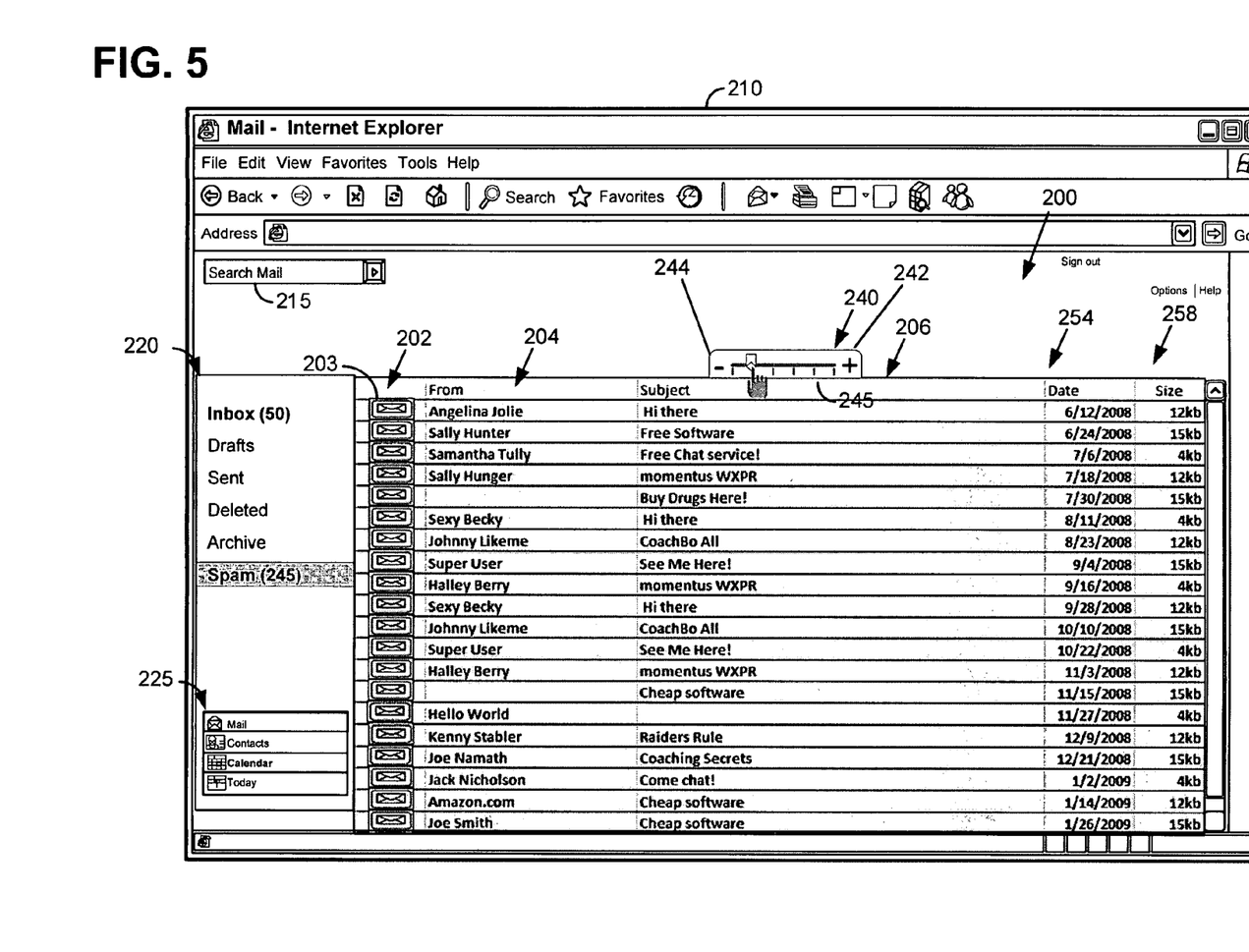

FIGS. 4 and 5 illustrate the effect of the slider on the Spam folder view. In FIGS. 4 and 5 the slider position corresponds to that shown in FIGS. 2 and 3. Note for example the movement of three messages 160 between the Spam folder and Inbox folder (FIG. 2) given the respective aggressive setting (FIG. 4) and a less aggressive setting (FIG. 5). In the setting of FIG. 4, these messages 160 are now found in the Inbox.

It will be understood that movement of the slider is dynamic and dynamically affects the display. That is, immediate movement of the slider between any of the positions on the sliding scale immediately changes the view in the inbox screen. It will be noted that depending on the particular technology in use with respect to rendering the screen, screen refresh may be necessary, however given current web development technologies, a dynamic update of the screen will allow additional message center information to be provided into the user interface 100 as the user slides the indicator 140 between the plus and minus positions. To further highlight the changes effected by the slider, animations may be used, particularly in showing the appearance and disappearance of messages.

This dynamic updating allows the user to actually see which messages would have been deleted by the filters based on the aggregate thresholds and allows the user to take the necessary action to rescue messages that might have been incorrectly deleted by a spam filter. Such incorrectly deleted messages are generally referred to as false positive. Some users may experience lower false positives and some may experience a higher number of false positives based on the spam setting heuristics and metadata associated with each of the messages. Using the slider device, users can see email that would have been deleted and take the action necessary to help with furthering filtering decisions. This can allow a user to save those false positive emails which are detected as spam by the spam filtering system. The user may retain the new setting or return to the more aggressive one, and is now better able to make that decision having seen the results in both situations.

Figure 6:
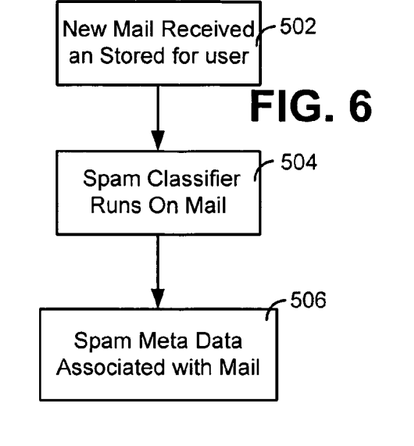
FIG. 6 is a flowchart depicting a method in accordance with the present technology.

FIG. 6 illustrates a first method wherein email received by the service provider or email client received and stored. At step 502, mail is received, and at step 504 a spam classifier runs on the mail. At step 506, spam metadata is associated with the mail message and stored along with the message. Metadata which may be associated with the mail includes a spam score determined by the spam filter giving a relative chance that the mail associated with the header is in fact spam, information on whether or not other users have deleted or white listed the user address or domain, domain safety information, maintained by the service provider or client application, user white list information, user black list information, and other metadata which indicates the safety or character of the email stored.

Figure 7A:
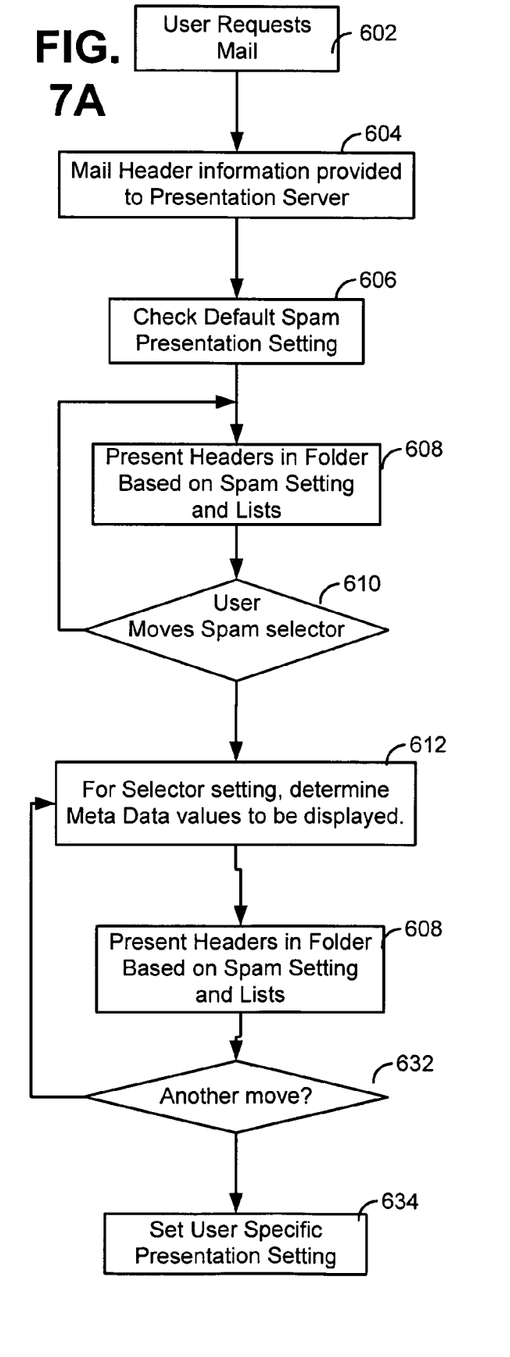
FIG. 7A is a flowchart depicting a method for dynamically displaying email headers in response to user input in accordance with the present technology.

FIG. 7A illustrates the method in accordance with the technology for presenting the headers to a user. At step 602, a user requests mail by accessing a web page which displays the user interface 200 illustrated in FIGS. 1-5. At step 604, mail header information is presented to the email server in order to allow the email server to present the user interface. At step 606, the email server checks the default spam presentation setting set by the slider 240. Based on the presentation setting, the UI is rendered and the header is presented based on the spam setting list at step 608.

Figure 7B:
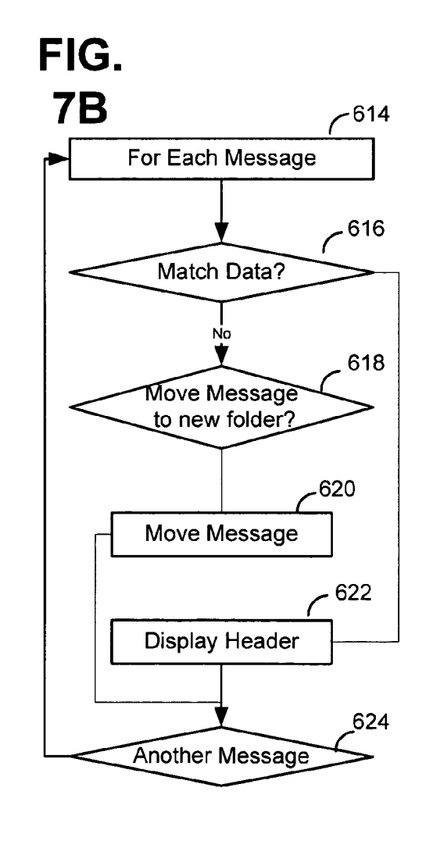
FIG. 7B is a flowchart illustrating a method for determining whether to display header information for a user.

As illustrated in FIG. 7B, step 608 includes, for each message at step 614, a matching of the meta data to a set of display characteristics occurs at step 616. The view severity selector determines multiple sets of display characteristics which can be used to filter metadata in turn determines which email summaries are shown in the interface. At 616, a determination is made as to whether or not the data associated with a message header matches or exceeds the allowable characteristics of the spam filter settings determined by the slider 240. If so, then the summary information is displayed at 622. If not, at step 618, a determination is made as to whether the message should be moved to a different folder. In one example, a message may be moved from an Inbox to the Spam folder on a higher threshold setting. In another example, a message in the Spam folder may be deleted entirely, or moved to the deleted items folder. If the message should be moved, then the message is moved at step 620. This continues for all messages at 624.

One characteristic can be whether or not the message's spam score exceeds a threshold. Another characteristic may be whether the domain is listed on global or user black list. Yet another characteristic may be whether the user has whitelisted the item. The lowest user threshold—the (−) setting—would allow all mail received for the user to be presented in the interface, regardless of any data associated with the message. The highest setting—the (+) sign—would allow only known or white-listed items to be shown. One or more of the characteristics can outweigh other characteristics. For example, if a message arrives from a domain which is indicated to be on a global blacklist, but from an address which the user has white listed, the white listing of the message address can outweigh the global blacklist characteristic.

If the metadata matches or exceeds the filter settings, then the header is displayed at 618. Each message is cycled through at step 620 until all messages matching or exceeding the allowable metadata display are displayed. Returning to FIG. 6A, at step 610, the system awaits user interaction with the slider 240. It will be understood that no action may occur and the user may be happy with the particular setting. Once a user moves the spam selector at step 610, for the new selector setting, metadata values associated with the new setting are determined at step 612. Once again presentation of the headers associated with the setting occurs at step 608. At step 632, the system waits for any other moves and if no other moves occur, the user specific presentation setting utilized for the next rendering of the user interface is set at step 634.

Figure 8:
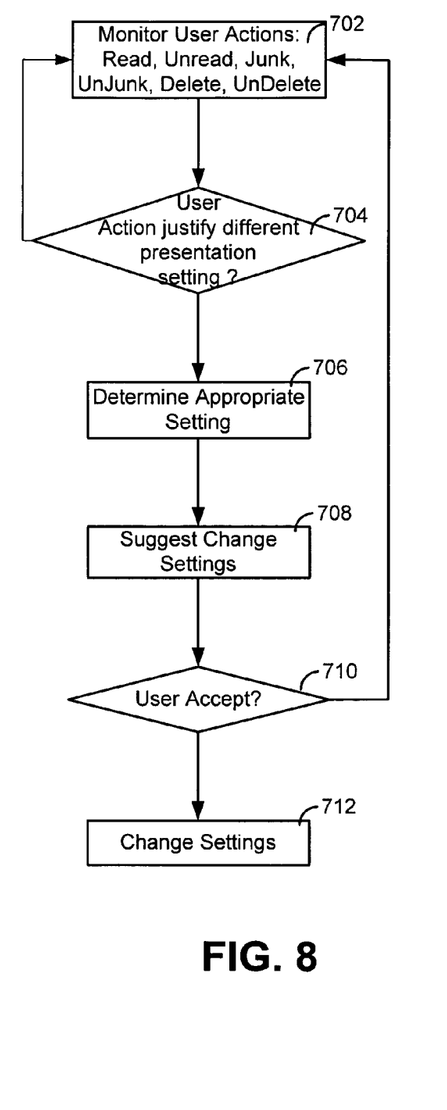
FIG. 8 is a method for modifying user settings in accordance with the present technology.

FIG. 8 illustrates a method whereby the system may determine whether or not to suggest to the user that the presentation display indicator 240 should be changed. At step 702, user actions with respect to their own mailbox can be monitored. Such actions can include determining which email messages from which entities and which specific addresses a user regularly reads, regularly does not read, regularly sends to a junk mail folder, regularly specifies and identifies as junk mail, regularly removes from a junk folder, regularly deletes, or regularly un-deletes. Based on a number of determinative heuristics, including, for example, the frequency with which a particular address or domain has a particular action associated with it, at step 702, a determination is made as to whether or not a particular action on a particular characteristic justifies a different email setting for the slider 240. If so, then at step 706, a new appropriate setting is determined, and at step 708, the new appropriate setting is suggested to the user via one or more means. For example, the user may be presented with a popup window the next time the user logs into the system and selects to render the user interface. Alternatively, the slider 240 may be highlighted in a popup window display suggesting that the user increase or decrease their slider setting. If the user selects the change at step 710, then the changed settings are recorded at step 710 for the next instance of the user rendering the interface.

Figure 9:
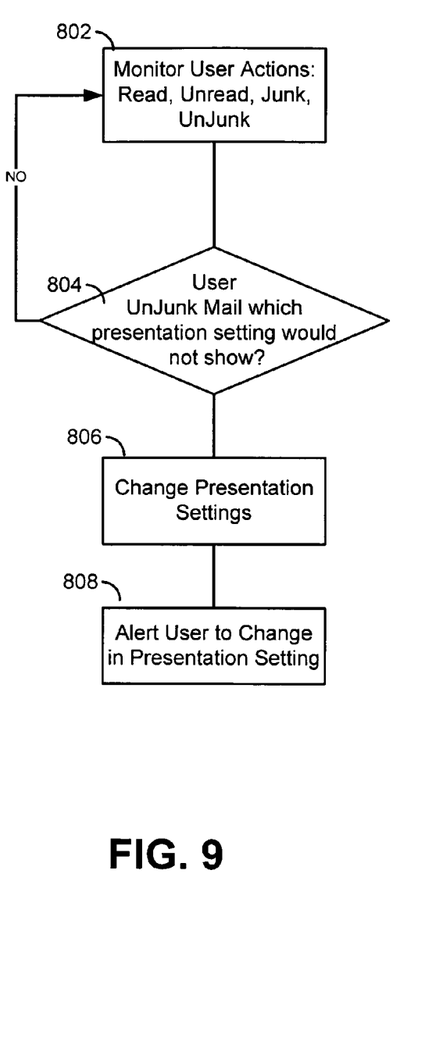
FIG. 9 is a second method for modifying user settings in accordance with the present technology.

FIG. 9 illustrates yet another embodiment of the present technology wherein the technology changed the user setting prior to asking the user. At step 802, actions are monitored in a manner similar to that discussed above with respect to step 702. If a user action justifies a different presentation setting at step 804, then at step 806, presentation settings are automatically changed by the system. At step 808, the user is alerted to the change by any one of the mechanisms discussed above. In this case, however, the change has already been made automatically by the system and the user is prompted with a notification, rather than a suggestion to make the change themselves. Alternatively, step 808 may be omitted, and the activity may occur completely in the background. In an alternative embodiment, the user need not be notified of the change to the view severity selector. The system can skip step 808, making the change automatically.

In yet another embodiment, when a user fails to make changes to the view severity selector for some amount of time, the severity selector can be removed from the interface. Monitoring of user actions on email viewing, deleting and reporting may continue and should the user activity justify returning the view selector to the interface, or changing the settings automatically, such action can be performed.

In a further embodiment of the technology, the effects of the view threshold selector 240 can be linked to the mail search interface 215. Each search result for a message will have associated with it metadata allowing the view severity selector to determine whether it should be displayed in a search result. For example, a user can select to display only safe messages and then enter a search query to the interface 215, with the query running only on safe messages. Alternatively, the user can expand the search window using the slider interface to include all mail, including spam, and have the search results pane also present a user interface similar to that shown in FIG. 2, with the slider increasing or decreasing the search results interface based on the setting of the interface.

Figure 10:
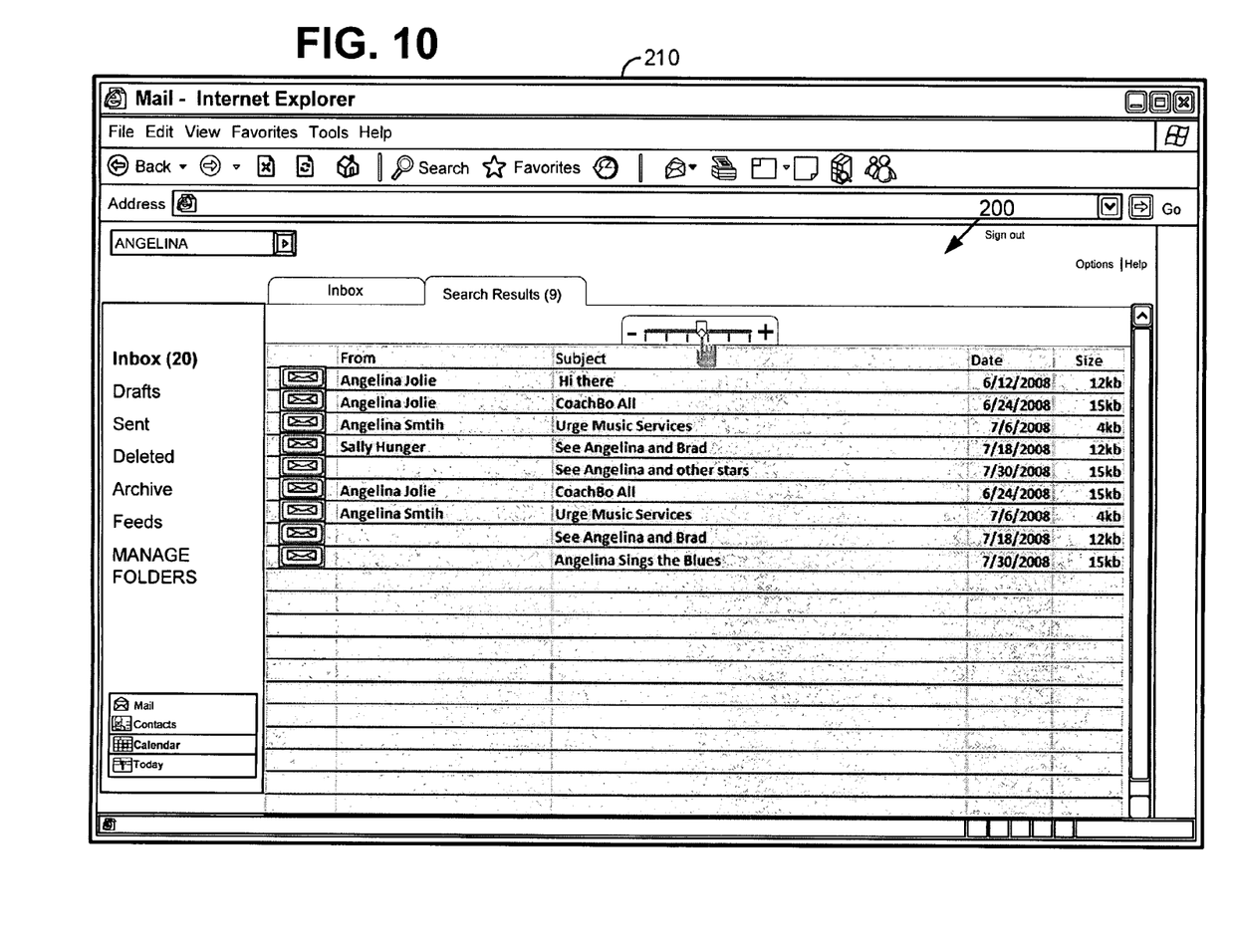
FIGS. 10 and 11 illustrate the effect of changing the threshold display in a user interface for a search folder.
Figure 11:
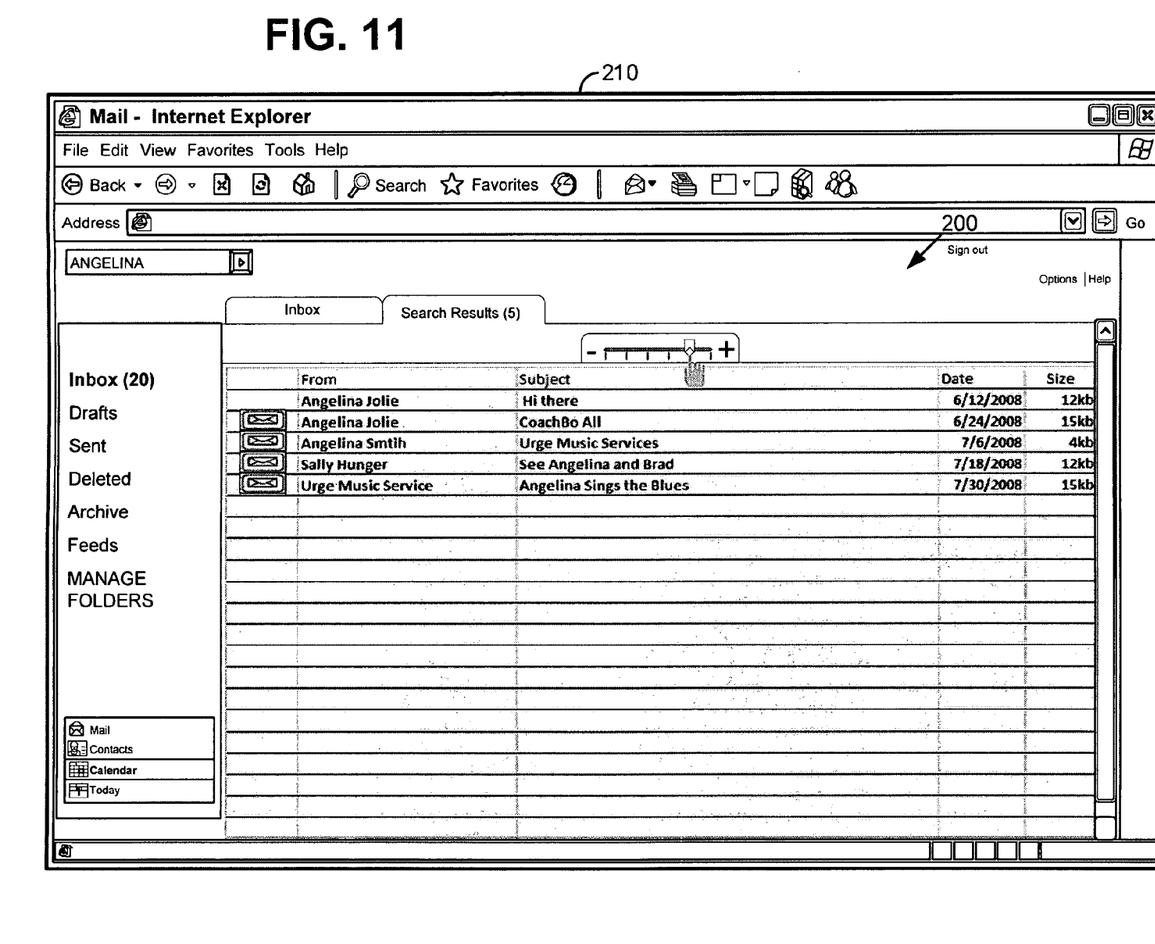

FIGS. 10 and 11 illustrate the effect of the slider on search results. In FIG. 10, the slider interface is selected at a middle threshold while in FIG. 11, increasing the threshold reduces the mail searched and hence, the search results.

Figure 12:
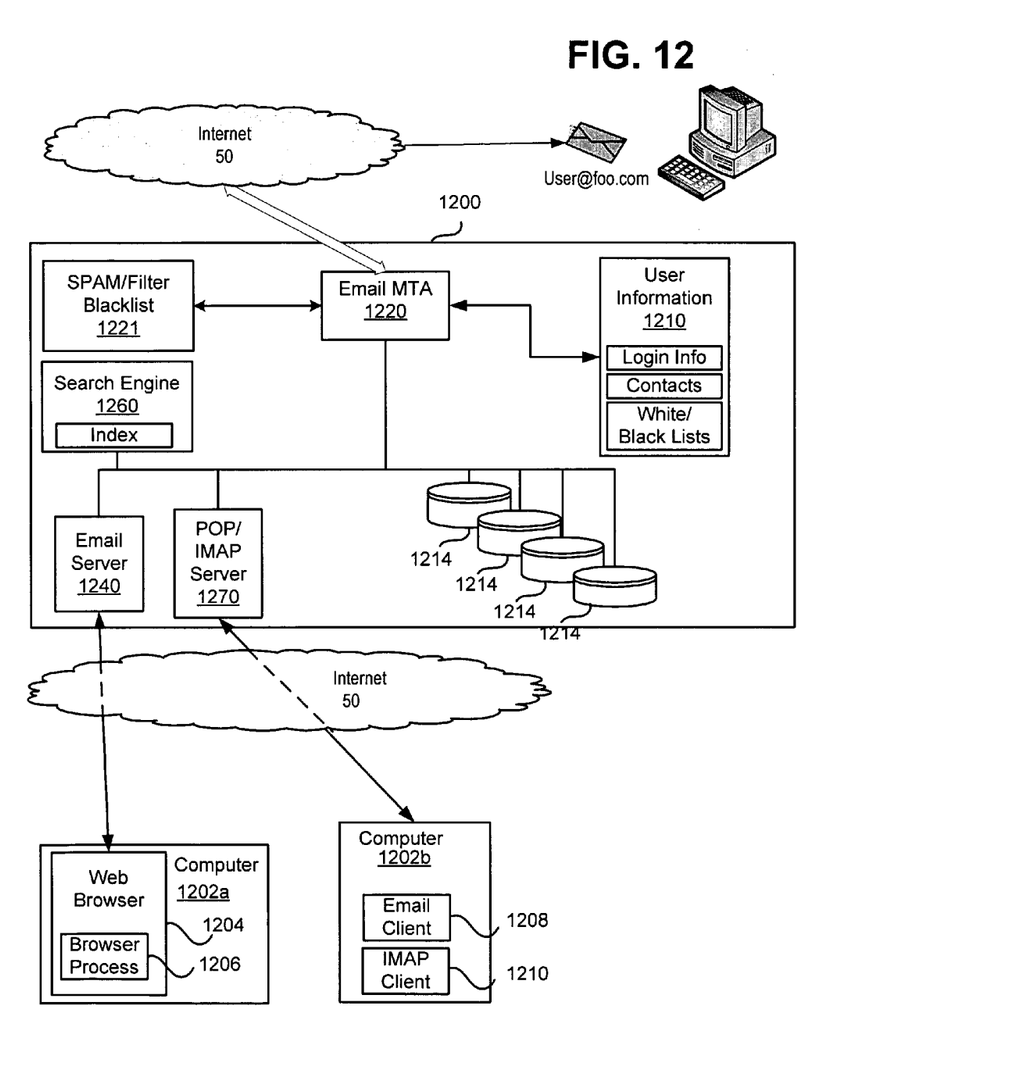
FIG. 12 depicts a system for implementing the technology discussed herein.

FIG. 12 is a block diagram showing one system suitable for implementing the present technology. FIG. 12 illustrates service provider system 1200 which provides Internet based application. Such systems are currently operated by enterprise service providers such as Microsoft®, Yahoo®, AOL®, or other online service providers. System 1200 is comprised of a plurality of computing devices dedicated to offering email services to users having accounts with the online service provider. Services other than email may be provided by the online service provider, but for purposes of explanation with respect to the present technology, such services are not shown in FIG. 12. In one embodiment, system 1200 includes a message transfer agent (MTA) 1220, a user information database server 1210, user mail storage units 1214, an email server 1250, a search server 1260, a SPAM/Blacklist server 1221 and a POP/IMAP server 1270. While each "server" is described in the singular, it will be understood that the functions performed by a server in the system may be provided by a plurality of servers in a distributed computing environment, such that there may be numerous MTAs, database servers, email servers and the like. The system may include additional components not shown here for convenience in understanding the present technology.

System 1200 allows users operating processing devices 1202*a*, 1202*b* to access their email data and forward outbound messages to users within the domain of system 1200 and domains accessible via the Internet 50. Typical messages from senders to users having accounts with the system 200 are sent via Internet 50 to the MTA 1220. Outbound messages from users on computers 1202*a* and 1202*b* are sent to other users on the Internet and in ESP 1200 via the MTA 1220. It should be understood that users themselves may connect to system 1200 via any number of public or private networks, including the Internet. Email MTA 1220 generally uses SMTP to route mail via the Internet 50 to users at other Internet accessible domains.

Email MTA 1220 is a front end server to which emails transmitted via the Internet (or other suitable network) to the system 1200 are directed, and which forwards messages from users of the messaging system 1200. The user database server 1210 is a data store of user account and storage location information for each of the users having a user account or email address within system 1200. The user database server 1210 stores information allowing users to authenticate themselves to the system 1200 to access their email, and to allow other servers in the system to direct mail within the system to storage locations on storage units 1214 based on the routing instructions in the system 1200. Other personal information may be included on the user information store 1210, including for example, contact information, calendar events, instant messenger buddy lists, and the like. Each user may be allowed to define a personal white list and black list. The white lists specify email addresses or domains from which the user always wants to receive mail. Conversely, a black list specifies email addresses or domains from which the user never wants to receive mail.

The storage units 1214 are essentially large disc arrays storing actual user message information. Email information associated with a user is stored in one or more locations on the storage unit and accesses as necessary by the email server 1240, POP/IMAP server 1270 and search engine 1260.

Spam/Blacklist server 1221 runs one or more spam filters on incoming messages to determine the likelihood that a message is spam, junk or phishing mail. A spam filter may operate on a specific server 1221, on the MTA 1220, or on another processing device such as the email server. Email data stored on each of the storage units 1214 may be stored with associated metadata indicating the likelihood that a particular message is spam. This metadata may include the spam score, whether or not a user has indicated a willingness to receive email from the location or domain or block email from the location or domain, whether or not the address or domain is on the global white or black list, and whether other users in the system have placed the address or address on their own white or black list. The above listing of meta data is not exclusive and is merely exemplary.

Email server 1240 may comprise a Web application server which provides an email interface to a Web browser 1208 in a browser process 1206 on a user computer 1202*a*. Email server 1240 renders email data in the user interface, the email data being retrieved from the data storage units in response to input from the user on the processing device 1202*a*. Likewise POP/IMAP server 1270 can provide email data to a POP email client 1218 or an IMAP client 1210 on user computer 1202*b* in response to requests from each such client application. The method of FIG. 6 may be performed by the email server 250 or POP/IMAP server 270 by providing the message summary info and meta data to the device, and running the method in conjunction with providing the display UI.

A search server 1260 is provided to allow users to perform key word searching on their mail data. The engine constantly crawls the storage unit data, creating an index of data in the storage units. When a user enters a search term into a user interface for the search engine, the index returns a list of search results in the form of messages containing the search term. The list of items that meet the criteria specified by the query is sorted, or ranked and presented to the user.

Dynamic display of the messages is accomplished by transmitting message headers and associated messages to the web server or POP/IMAP server, which controls the filter display of headers. In a web interface, control of the interface presentation may be provided by altering the user interface presented. In the case of a POP/IMAP system, a situation may arise where the ESP allows setting of the threshold slider which affect users having email clients where presentation of the slider interface is not directly available in the client. This can be addressed in different ways.

In a first embodiment, where a POP or IMAP client is aware of changes to the slider interface, the client may be provided with the view severity selector which performs header filtering based on metadata in the client. Filtering may also be performed at the POP/IMAP server when requests for information are sent to the server. For POP requests, control of whether the filtering may be applied going forward of any change to the view severity selector. Alternatively, in POP environment, changes to the view severity selector may trigger query allowing the user to delete all their mail and initiate a complete re-download of all user messages designated to folders based on the new threshold setting. Changes affecting and IMAP client can be filtered at the server level and transmitted to the client when a folder refresh occurs. It should be noted that the view severity selector may be changed in a web interface and have an effect on a POP or IMAP client. The view severity selector need not be provided in the client interface directly. Clients incorporating the view severity selector will be provided the same header information which would be provided to the web interface 200.

Figure 13:
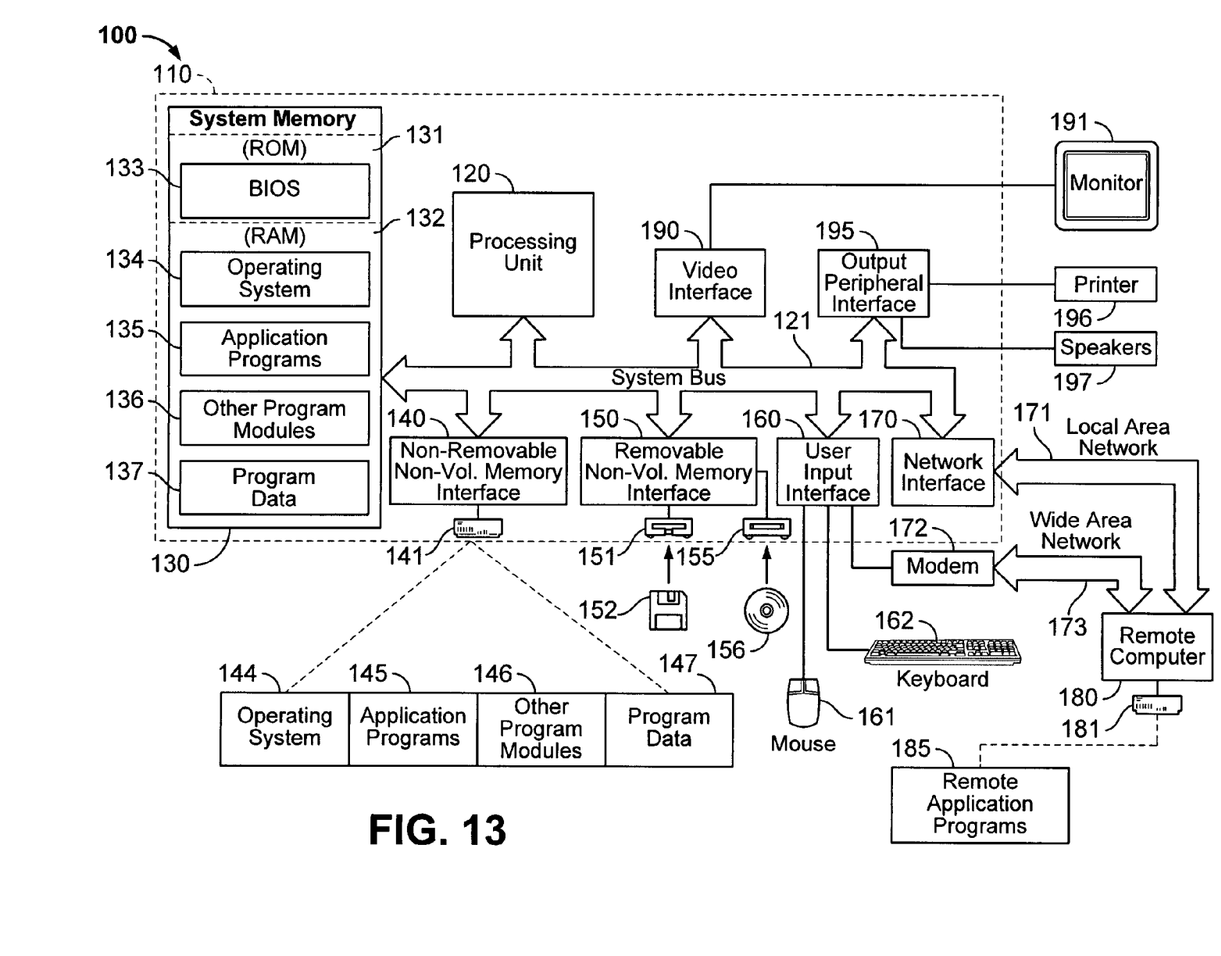
FIG. 13 is a depiction of a processing device for use in accordance with the present technology.

FIG. 13 illustrates an example of a suitable computing system environment 100 such as a personal computer.

With reference to FIG. 13, an exemplary system for implementing the technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 13 illustrates operating system 134, application programs 135, other program modules 136, and program data 137.

The computer 110 may also include other removable/non-removable, volatile/nonvolatile computer storage media. By way of example only, FIG. 13 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 13, provide storage of computer readable instructions, data structures, program modules and other data for the computer 110. In FIG. 13, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 13. The logical connections depicted in FIG. 13 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 13 illustrates remote application programs 185 as residing on memory device 181. It will be appreciated that the network connections shown are exemplary and other means of establishing a communications link between the computers may be used.

The computing system environment 100 is only one example of a suitable computing environment on which the technology may be implemented and is not intended to suggest any limitation as to the scope of use or functionality of the technology. Neither should the computing environment 100 be interpreted as having any dependency or requirement relating to any one or combination of components illustrated in the exemplary operating environment 100.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of displaying email messages to a user, comprising:
   (a) associating spam severity meta data with an email message received for the user;
   (b) displaying a user interface comprising at least a first portion showing a first set listing of email summary information comprising a first listing of email messages in an email folder and a second portion including a view selector, the first set listing of email summary information based on whether the meta data associated with each email message in the first listing of email messages meets or exceeds a first threshold display level;
   (c) receiving via the user interface an indication from a user indicative via the view selector to change the first threshold display level and the first set listing; and
   (d) responsive to the indication, dynamically displaying a second set listing of email message summary information comprising a second listing of email messages in the user interface based on a second threshold display level; and
   (e) dynamically determining that a change in the second threshold display level is justified based on monitoring user actions with respect to the second set listing of email summary information.

2. The computer implemented metyhod of claim 1 wherein step (d) presents a greater or fewer number of messages likely to be spam in the second set listing of email summary information.

3. The computer implemented method of claim 1 wherein the spam severity meta data includes one or more of: a spam score, data indicating a user's willingness to receive email from a location or domain; data indicating a user's desire to block email from a location or domain; data indicating whether an address or domain is on a global white or black list; and data indicating whether other users in the system have placed the address or address on their own white or black list.

4. The computer implemented method of claim 1 wherein the method further includes the step of routing messages between an inbox folder, a spam folder and a deleted items folder based on said step (c).

5. The computer implemented method of claim 1 wherein said steps (b), (c), and (d) occur in a user interface provided in a Web browser.

6. The computer implemented method of claim 1 wherein the view selector is a slider.

7. The computer implemented method of claim 1 wherein the step of dynamically determining is performed by monitoring user actions on the second listing of email messages, the user actions comprising one or more of reading mail, leaving mail unread, deleting mail, un-deleting mail, marking mail as junk.

8. In a computer system having a graphical user interface including a display and a user interface selection device, a method of displaying email summary information, comprising the steps of:
   (a) displaying a threshold view selector in a first portion of the user interface;
   (b) displaying a summary of email message headers in a listing in a second portion of the user interface, a number of headers in the summary of email message headers being responsive to a first spam view threshold value associated with the threshold view selector;
   (c) receiving input from the user interface selection device via the threshold view selector to change the number of headers in the summary of email message headers, the input changing the first spam view threshold value to a second spam view threshold value to display more or fewer email summary items likely to be spam in the email summary information based on classification and meta data associated with each email message;
   (d) in response to the input, dynamically displaying more or fewer email summary items likely to be spam in the email summary information based on the second spam view threshold value;
   (e) monitoring user actions with respect to the email summary information; and
   (f) determining whether the second spam view threshold value should be altered based on said user actions with respect to the email summary information.

9. The method of claim 8 wherein the step of dynamically displaying comprises
   determining for each email message whether the summary information for the email message should be displayed based on whether meta data associated with the email message meets or exceeds the second spam view threshold value comprising a set of characteristics.

10. The method of claim 9 wherein the meta data includes one or more of: a spam score, data indicating a user's willingness to receive email from a location or domain; data indicating a user's desire to block email from a location or domain; data indicating whether an address or domain is on the global white or black list; and data indicating whether other users in the system have placed the address or address on their own white or black list.

11. The method of claim 8 further including the step of alerting the user that a change in the second spam view threshold value is merited based on the user actions and suggesting a different spam view threshold value to the user.

12. The method of claim 8 further including the step of altering the second spam view threshold value based on the user actions.

13. The method of claim 12 further including the step of notifying the user of the change.

14. A computer implemented method of dynamically displaying user changes to email message summary information based on whether the email messages comprise spam email, comprising:
   (a) displaying a user interface, the user interface including a first portion displaying email summary information comprising a listing of email message header summary information for a folder in which the email message associated with each item in the listing meets or exceeds a first threshold display level, the user interface including a second portion displaying a dynamic display view selector;
   (b) receiving user input via the display selector which indicates that the first threshold display level presents too many or too few email message summaries in the listing, the input selecting to view email messages more or less likely to be spam messages, the input changing the first threshold display level to a second threshold display level responsive to a movement of the dynamic display view selector; and (c) in response to step (b), dynamically determining whether each email message summary available for presentation to a user meets or exceeds the second threshold display level and dynamically presenting a revised listing of email message header summary information in the user interface responsive to said movement of the selector, thereby providing visual feedback on the movement of the display selector;

(d) determining a third threshold display level different from said second threshold display level responsive to monitoring user interactions with respect to the revised listing of email message header summary information; and (e) recommending the third threshold display level to the user responsive to said determining.

15. The computer implemented method of claim 14 wherein said step (a) comprises determining the first threshold display level comprising a first set of characteristics of meta data associated with each message; and determining for each message whether the summary information for the message should be displayed based on whether meta data associated with the message meets or exceeds such first set of characteristics.

16. The computer implemented method of claim 15 wherein said step (c) comprises determining the second threshold display level comprising a second set of characteristics of meta data associated with each message; and determining for each message whether the summary information for the message should be displayed based on whether meta data associated with the message meets or exceeds such second set of characteristics.

17. The computer implemented method of claim 16 wherein step (b) comprises monitoring user actions on the summary information, the user actions comprising one or more of reading mail, leaving mail unread, deleting mail, un-deleting mail, marking mail as junk, and suggesting a change in the threshold display level based on such user interactions.

18. The method of claim 1 further comprising recommending a threshold display level different from said second threshold display level to the user.

19. The method of claim 1 further comprising:

(f) automatically altering said second threshold display level based on said user interactions with respect to said second set listing email summary information; and (g) notifying the user of said altering of said second threshold display level.

* * * * *